United States Patent Office 3,180,049
Patented Apr. 27, 1965

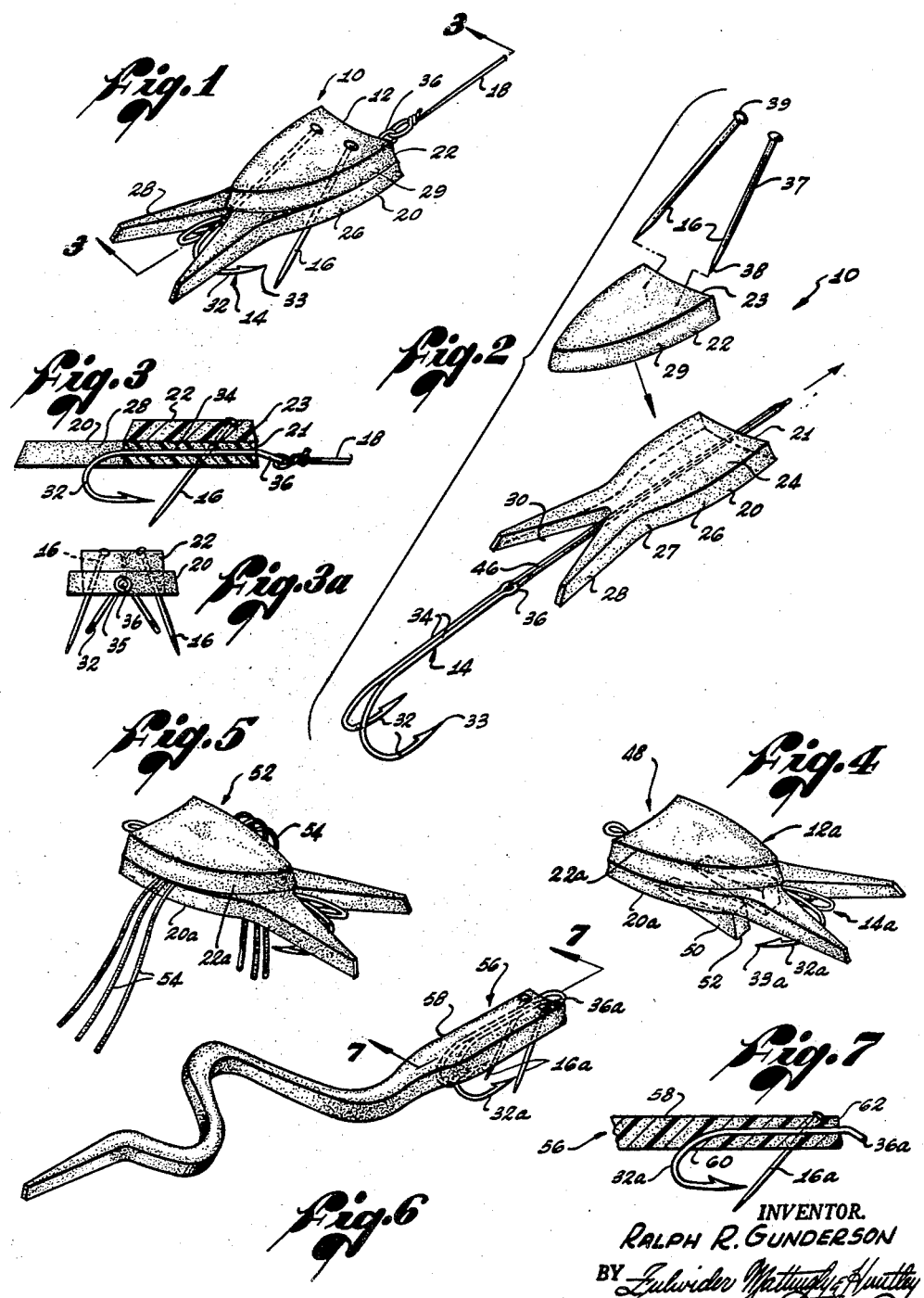

3,180,049
FISH LURE
Ralph R. Gunderson, 2450 S. Prairie Ave., Chicago, Ill.
Filed Oct. 26, 1961, Ser. No. 147,932
5 Claims. (Cl. 43—42.3)

This invention relates to fish lures and more particularly to a lure having a body constructed of a resilient, deformable, and highly buoyant material.

Fish lures presently on the market are constructed primarily of hard, non-resilient materials, such as metal, and have certain inherent disadvantages. One such disadvantage is that they are unrealistic to the touch of a fish and are frequently taken and then spit out before the fish is securely hooked.

Another inherent disadvantage of metal lures in particular is that they tarnish after periods of use or storage. Tarnishing detracts from their utility, as in that condition they fail to effectively attract the fish.

Still another disadvantage of many lures formed of hard, non-resilient materials is that when formed in certain desirable shapes, they are not sufficiently buoyant in water to ride on the surface or to track at the desired depth while being worked in the preferred manner. This is particularly true in the case where more than a single hook is supported by the lure body.

In view of the foregoing, it is a primary object of this invention to provide a fish lure having a resilient, deformable, and highly buoyant body, which lure serves to obviate the above discussed disadvantages of the prior art.

Another object is to provide a lure with a body constructed of a plastic foam having physical properties rendering it realistic to the touch of a fish.

Still another object is to provide a fish lure in which the lure body is sufficiently buoyant to support a plurality of hooks on the surface or at the desired depth in the water, while the lure is being worked in the preferred manner.

It is also an object to provide a lure of the type described which is readily adapted to be constructed in any reasonable shape without detracting from its utility.

Still another object is to provide a fish lure of the type described which is durable and reliable in operation, yet which is relatively simple in construction and inexpensive to manufacture.

These and other objects and advantages of the invention will be better understood by referring to the following detailed description taken in conjunction with the accompanying drawing in which:

FIGURE 1 is a perspective view of a preferred form of fish lure, constructed in accordance with my invention;

FIGURE 2 is an exploded view in perspective of the lure illustrated in FIGURE 1;

FIGURE 3 is a section view taken on the line 3—3 of FIGURE 1;

FIGURE 3a is a rear elevation view of the lure shown in FIGURE 1;

FIGURE 4 is a perspective view of a modified form of the invention;

FIGURE 5 is a perspective view of another modified form of the invention;

FIGURE 6 is a perspective view of a further modified form of the invention; and

FIGURE 7 is a partial section taken on the line 7—7 of FIGURE 6.

Referring to the drawing and in particular to FIGURE 1, the preferred lure of the invention is indicated generally by the reference numeral 10. Lure 10 includes a body 12, a hook 14 supported by the body, and a pair of cooperating weed guards 16 carried by the body. Each of the parts making up the lure and their associations will be described more fully below.

The lure body 12 is preferably constructed of a closed cellular plastic foam which is resilient, deformable, and highly buoyant in water. A material having the physical properties of resilience and deformability is preferred for the reason that it will more accurately simulate the feel of an insect body or other live bait. A buoyant material is desired, as suggested above, in order to support the hook on the surface of the water. Although the lure of the invention is primarily intended to be a surface or semi-surface lure, it will be appreciated that by suitable weighting it can be used at any desired depth, while being worked in the desired manner. One such plastic material, which is highly satisfactory in the present application, is synthetic sheet rubber prepared from chloroprene.

For convenience of description, the terms forwardly and rearwardly and upper and lower are used in describing the lure 10. These terms have meaning with reference to the orientation of the lure 10 in the drawing. Thus, the forward end of the lure 10 is adjacent the leader 18 to which it is attached, while the hook 14 and weed guards 16 project downwardly from the lure body 12.

As seen best in FIGURE 2, the lure body 12 comprises a lower or hook supporting portion 20, and an upper portion 22. The two portions or layers are secured together by a suitable adhesive material (not shown) to simulate the shape of a live bait. One advantage of the present laminated or multi-layer construction is that the two body portions 20 and 22 may be provided in different colors to increase the attractiveness of the lure.

The lower or hook supporting portion 20 is elongated and flat in shape and has a forward section 24 with side walls 26 that curve generally inwardly and rearwardly toward one another to a waist section 27. From this waist section 27, a pair of divergent ears or projections 28 extend rearwardly to define a generally V-shaped space 30 between them.

The upper portion 22 is likewise flat in shape and has side walls 29 which curve generally inwardly and rearwardly in converging relation to terminate in a rounded edge. As may be seen in FIGURE 1, the upper body portion 22 is shaped so as to be substantially congruent with the forward section 24 of the lower body portion 20 and is positioned to overlie that section.

It is desirable that some turbulence be created, as the lure 10 is moved through the water to better attract fish. One method of accomplishing this, is to make the end walls or faces 21 and 23 of the body portion 20 and 22, respectively, slightly concave as illustrated in the drawing.

Other refinements in shape may be made, depending, of course, upon the particular conditions under which the lure is to be used. One such refinement in shape is illustrated in FIGURES 1 and 2 and involves tapering the aligned side walls 26 and 29 of the respective upper and lower body portions 20 and 22 and the end walls 21 and 23 slightly inwardly and upwardly. The purpose of this tapering is to more closely approximate the actual shape of live bait or natural food.

The hook 14 preferably, though not necessarily, is of the double-headed type. That is, it includes two barbed heads 32 arranged at an acute angle to one another. Extending forward from the barbed heads 32 are a pair of parallel and contiguous shanks 34 which, in turn, are secured together, as by welding. Integral with the shank portions 34 at the forward ends thereof is an eyelet 36 which connects the individual shank portions 34 and which is adapted to be joined to the leader 18. Although the eyelet 36 here comprises a conventional looped portion of the hook, any suitable joining means may be used and is embraced by the term "eyelet" as used in the claims.

As suggested above, the hook 14 is supported by the lower body portion 22. When so supported, the shank portions 34 extend longitudinally, front to rear, of that body portion 22, as illustrated in FIGURE 3. The barbed heads 32 of the hook 14, on the other hand, project exteriorly from the portion 20 at the apex of the V-shaped space 30 defined between the divergent ears 28. Referring again to FIGURE 3, the barbed heads curve generally rearwardly and downwardly and then toward the forward end of the body portion 20.

Projecting from the forward end wall 21 of the portion 20 is the eyelet 36 in such a manner that it may be conveniently secured to the leader 18.

The weed guards 16, as the term implies, serve to prevent the lure 10 from becoming hung up on weeds or other similar obstructions. A feature of the lure of my invention is that this function is accomplished without detracting from the utility of the lure in hooking the fish. In fact, as will be brought out below, the weed guards 16 aid in maintaining the fish on the lure, once it is hooked.

The weed guards 16 comprise a pair of straight pins, each of which embodies an elongated shank 37 with a tapered point 38 at one end and an enlarged head 39 on the other. The guards are resiliently gripped in their protective position, wherein the shanks 37 extend generally downwardly and rearwardly through both body portions 20 and 22. By virtue of this, the guards serve to hold the body portions in assembly with one another. As illustrated in FIGURES 3 and 3a, the guards 16 are arranged at an acute angle to the flat upper and lower surfaces of the lure body 12 and, in addition, at an acute angle to one another approximately equal to the angle of separation of the barbed heads 32 of the hook.

The guards 16 are carried by the lure body 12 in such a manner that the heads 39 are disposed flush with the upper surface of the upper body portion 22 adjacent its forward end to simulate eyes, giving the lure a life-like appearance. On the other hand, the opposite ends of the guards project downwardly of the lower surface of the lower body portion in protective relationship with the barbed heads 32 of the hook 14. The tapered points or tips of the barbed heads 32 of the hook are located rearwardly of a plane defined by the guards 16, as illustrated in FIGURES 1 and 3. As may also be seen in those figures, the points 33 of the barbed heads are also located above the tapered points 38 of the guards. Referring to FIGURE 3a, each of the guards 16 is positioned outwardly of its adjacent barbed head.

Thus, it will be appreciated that the guards 16, here comprising a pair of straight pins, inherently serve a number of functions. Briefly summarizing, the shanks 37 aid in holding the body portions in assembly with one another, the heads 39 simulate eyes to give the lure a life-like appearance, and the end portions adjacent the points 38 function as weed guards.

In use, the lure 10 is attached directly to the line or leader 18 as by tying the latter to the eyelet 36. As mentioned above, the lure 10 is intended primarily as a surface or semi-surface lure. For this reason, a conventional swivel between the leader 18 and the eyelet 36 or other means serving to weight the lure are not usually employed. However, in some instances it may be desired to work the lure considerably below the surface. In such instances, a conventional swivel conveniently serves to weight the lure and thereby accomplish the desired result. It will be appreciated that swivels of various weights may be used, depending upon the particular depth at which it is desired that the lure 10 be worked. For example, if it is desired that the lure 10 track fairly deep in the water body, a relatively heavy swivel will be provided. Conversely, if it is desired that the lure track at a fairly shallow depth, a relatively light swivel is, of course, provided.

Once, the lure is attached to the leader, it is then worked in the preferred manner by moving it along on the surface or just below the surface of the water. The center of gravity of the lure 10 is such that it maintains the attitude shown in FIGURES 1 and 3 during use. Should the lure 10 encounter any weeds or similar obstructions, the guards 16 guide the relatively light lure away from the weeds or obstruction and thereby prevent the barbed head 32 of the hook 14 from becoming hung up. On the other hand, when the fish strikes the lure, the resilience of the lure body allows the guards to yieldably pivot upwardly relative to the hook 14 to expose the points 33 of the barbed heads 32, whereupon they engage in the fish's mouth.

As suggested above, once the fish is hooked the guards 16 serve the added function of preventing the hook from becoming inadvertently dislodged. This is true as, in order to dislodge the hook, the fish must move forwardly relative to the lure 10. tI will be appreciated that the guards 16 are positioned to oppose such movement.

Besides being highly effective in accomplishing its intended purpose, the lure 10 of the invention is extremely durable. The lure body 12, being formed of a plastic material, has no tendency to tarnish. Moreover, since the material forming the lure body is resilient and deformable, it will not crack or break when subjected to a compressive force.

Further, the closed cellular plastic foam forming the body 12 is highly buoyant. This results in the lure 10 being adapted to be worked on the surface of the water. Weight may easily be added, as by means of a conventional swivel, if it is desired to sink the lure below the surface.

The method of making the preferred lure of the invention includes first cutting or stamping the body portions 20 and 22 from suitable sheet material having the physical properties discussed above. As is well known in the art, plastic foam readily lends itself to stamping. Referring to FIGURE 3, the upper body portion 22 is then adhesively joined to overlie the lower body portion 20, the portions 20 and 22 being arranged with their respective side walls 26 and 29 and end walls 21 and 23 substantially aligned.

Either before or after joining the layers or body portions 20 and 22 together, the hook 14 is threaded into or inserted in the lower body portion 20. Preferably, so as to achieve positive hook retention, the shank portions 34 are coated with a suitable adhesive, such as epoxy resin, prior to threading or insertion of the hook 14. Mounting of the hook 14 is accomplished in the illustrative method with the aid of a steel wire 46 fed through the eyelet 36 of the hook 14 and then doubled back on itself. In carrying out this operation, the wire 46 is entered into the portion 20 at the apex 31 and pushed out the end wall 21. The leading ends of the wire 46 are then gripped to pull the eyelet 36 completely through the portion 20 and to position the shank portions 34 of the hook within that body portion, where it is resiliently gripped in position.

The shank portions 34 may be threaded directly into the body portion 20 without the aid of the wire 46. However, when a double hook having an average size eyelet is used, it is advantageous to employ a member, such as the wire 46, to facilitate insertion of the hook.

Experience has shown that inserting the hook 14 into the body portion 22 does not cut away or remove portions of the material, but only serves to part the adjacent cells. Because of the adhesive coating on the shank portions 34 and because of the resilient quality of the material, the end result is that the shank portions are adhesively and resiliently gripped to positively maintain the hook in assembly with the lure body 12.

As an alternative method of construction, the shank portions 34 of the hook may be interposed or sandwiched between the adhesively joined surface of the body portions 20 and 22. This results in the hook 14 being adhesively secured between the body portions, it being understood that in this case threading of the hook 14 into one or more of the body portions does not take place.

The method further involves inserting the guards 16 into the lure body 12 at the positions indicated in phantom lines in FIGURE 2. As discussed above, the guards 16 are each provided with a tapered point 38 which facilitates this insertion. Preferably, before insertion, the guards 16 are coated with a suitable adhesive. As in the case of the hook, pushing the guards 16 through the plastic foam merely serves to part adjacent cells so that the guards are finally both adhesively and resiliently gripped in the positions shown in FIGURES 1, 3 and 3a.

Certain modified forms of the lure of the invention are illustrated in FIGURES 4 through 7. Various parts of these modified forms are identical to parts of the preferred embodiment described above. To simplify the description, these identical parts are assigned the same reference numerals and carry the subscript a.

A modified form of lure of my invention, indicated by the reference numeral 48, is illustrated in FIGURE 4. In this case, the lure body 12a and its relation with the hook 14a are the same as in the previous case. The present lure 48 differs from lure 10 in that weed guards 50, comprising triangular blocks, are attached to the lure body portion in place of the pin type guards 16, for performing the same function. The guards 50 are preferably formed of the same material used in the construction of the lure body and are attached to the body by a suitable adhesive.

In order to perform their protective function, each of the guards 50 is arranged adjacent to and on the forward side of an associated one of the barbed heads 32a of the hook 14. The guards 50 have lowermost edges 52 which are aligned in a horizontal plane spaced just slightly below the plane of the points 33a on the barbed heads 32a. The guards 50 function generally in the same manner as the guards 16 of the previous embodiment, except that they themselves are resilient and deformable. When the fish strikes the lure 48, the guards 50 are deformed so that the barbed heads 32a engage or set in the fish's mouth. A particular advantage of this form of lure is that increased buoyancy is obtained by virtue of the guards also being formed of a plastic foam. Another advantage is that material costs are further decreased, as the guards 50, like the body portions 20 and 22, may be stamped from suitable sheet material.

Another modified form of lure 52 is illustrated in FIGURE 5. The lure 52 is intended to illustrate the adaptability of this type of construction to a wide variety of body configurations. In the illustrative case, a plurality of tentacle like elastic strings 54 are positioned between the contacting surfaces of the body portions 20a and 22a prior to joining them together. Alternately, the strings 54 may be threaded through one or more of the body portions in the manner of the hook 14. Threading is accomplished by means of the wire 46 or a suitable needle. It will be appreciated that such a construction is advantageous from the standpoint of simulating an actual insect or other live bait. In place of the elastic strings 54, feathers or other well known lure parts may be substituted.

A still further modified form of lure 56 is illustrated in FIGURE 6. In this case, a single layer of material is provided, the lure body 58 being stamped from sheet material so that it normally, i.e., in its unstressed condition, has the curved shape shown in FIGURE 6. The advantage of such a lure body 58 is that as it is moved along on the surface of the water at varying speeds, the resistance afforded serves to continually deform the body 58, thus simulating the action of a worm or other similar live bait.

The body 58 supports a hook with its shank portions extending longitudinally of and within the body 58, as shown in FIGURE 7. The hook includes barbed heads 32a which project downwardly from the lower surface 60 of the body and an eyelet 36a which projects exteriorly of the end wall 62. Weed guards 16a are carried by the body 58 in cooperative relation with hooks 14a, so as to protect the barbed heads 32a in the manner described in connection with the preferred embodiment.

The method of making the lure 56 is similar to that described in conjunction with the preferred embodiment, except that no laminating of body portions is required. The lure body 58 is stamped from the sheet material and the hook is threaded or inserted through the lower surface 60 at a location proximate the front end wall 62 of the body 58 and positioned as described above and as shown in FIGURE 7. As in the previous cases, the wire 46 or its equivalent may be employed to facilitate this step.

Although certain embodiments of the invention have been described in detail, as have methods for making the same, it will be understood that these are by way of illustration and that numerous changes in the structure and arrangement and in the steps of the method may be resorted to without departing from the spirit and scope of the invention.

I claim:

1. A fish lure comprising: an elongated body including a plurality of layers of closed cellular plastic foam which is resilient and deformable; means securing said layers to one another in overlying relationship; a hook having a barbed head and an intermediate shank and an eyelet, said shank extending through and being resiliently gripped within at least one of said layers of said body, and said head and said eyelet projecting exteriorly from opposite ends of said body; and guard means carried by said body and including a member with an enlarged head disposed flush with said body to simulate an eye to give the lure a life-like appearance, and a shank extending through said layers and resiliently gripped thereby to aid in maintaining them in such relationship and having an end portion opposite said head projecting from said body in operative association with said barbed head, said projecting portion normally being in protective relation with said barbed head and being yieldably movable out of said relation.

2. A fish lure comprising: an elongated body formed of closed cellular plastic foam which is resilient, deformable, and buoyant in water and including flat upper and lower portions secured together, said lower portion having a forward section with a concave end wall and side walls extending inwardly and rearwardly from said end wall toward one another, a central waist section and divergent ears extending rearwardly from said waist section, said upper portion being generally congruent with the forward section of said lower portion and being positioned to overlie said forward section; an integral hook supported by said body, said hook having an elongated and substantially straight shank arranged longitudinally of and resiliently and adhesively gripped within said lower portion, a barbed head with a tapered point projecting downwardly from said lower portion at a location adjacent the junction of said divergent ears with said waist section, and an eyelet projecting forwardly from said end wall: and a pair of weed guards carried by said body, each of which includes an enlarged head disposed flush with the upper surface of said upper portion of said body to simulate an eye to give the lure a life-like appearance, a shank extending through both of said portions and resiliently gripped thereby to aid in maintaining them in such relationship and having an end portion opposite said head projecting downwardly from the lower surface of said lower portion of said body, said projecting portions of said shanks yieldably movable relative to said body upwardly of said point upon deformation of adjacent portions of said body.

3. The subject matter of claim 2 further characterized in that said upper and lower body portions are different in color.

4. A fish lure comprising: a plurality of layers of closed cellular plastic material which is resilient, deformable and highly buoyant in water; means securing said layers to one another in overlying relationship to provide a lure body with upper and lower surfaces; a hook embodying an elongated and substantially straight shank extending through and resiliently and adhesively gripped within said body and thereby held against longitudinal and rotational movement relative thereto, a barbed head on one end of said shank projecting downwardly from the lower surface of said body, and an eyelet on the opposite end of said shank projecting exteriorly of said body; and guard means carried by said body and including a member with an enlarged head disposed flush with the upper surface of said body to simulate an eye to give the lure a life-like appearance, and a shank extending through said layers and resiliently gripped thereby to aid in maintaining them in such relationship and having an end portion opposite said head projecting downwardly from the lower surface of said body proximate said barbed head, said projecting portion normally being in protective relation with said barbed head and being yieldably movable out of such relation.

5. A fish lure comprising: an elongated body formed of plastic material which is resilient, deformable and buoyant in water, and including flat upper and lower portions secured together in overlying relationship, at least one of said portions having a pair of divergent and rearwardly extending ears; an integral hook including a shank arranged longitudinally of said body and resiliently gripped therein, a barbed head with a tapered point projecting downwardly from said lower portion at a location adjacent the junction of said ears with the remainder of the associated body portion, and an eyelet projecting from the end of said body opposite said ears; and a pair of rigid weed guards carried by said body, each of which includes an enlarged head disposed flush with the upper surface of said upper portion of said body adjacent its forward end to simulate an eye to give the lure a life-like appearance, a shank extending through both of said portions and resiliently gripped thereby to aid in maintaining them in such relationship and having an end portion opposite said head projecting downwardly from the lower surface of said lower portion of said body below the point of said barbed head, said projecting portions being located on opposite sides of said barbed head and normally being in protective relation therewith and being yieldably movable relative to said body out of such relation.

References Cited by the Examiner
UNITED STATES PATENTS

| | | | |
|---|---|---|---|
| 859,227 | 7/07 | Jackson | 43—42.37 X |
| 1,435,177 | 11/22 | Peckinpaugh | 43—42.37 |
| 1,635,518 | 7/29 | Welch | 43—42.3 |
| 1,881,947 | 10/32 | Rawdon | 43—42.42 X |
| 2,231,949 | 2/41 | Rinehart | 43—42.37 X |
| 2,515,018 | 7/50 | Parnell | 43—42.3 |
| 2,544,265 | 3/51 | Kelly et al. | 43—42.53 |
| 2,753,651 | 7/56 | Fisher | 43—42.53 |
| 3,032,911 | 5/62 | Wilhelmi | 43—42.37 |

ABRAHAM G. STONE, *Primary Examiner.*

JOSEPH S. REICH, *Examiner.*